(12) United States Patent
Skovmose Kallesøe et al.

(10) Patent No.: US 10,184,671 B2
(45) Date of Patent: Jan. 22, 2019

(54) METHOD FOR LIMITING A SUPPLY FLOW IN A HEAT TRANSFER SYSTEM

(71) Applicant: GRUNDFOS HOLDING A/S, Bjerringbro (DK)

(72) Inventors: Carsten Skovmose Kallesøe, Viborg (DK); Brian Kongsgaard Nielsen, Viborg (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 256 days.

(21) Appl. No.: 14/747,370

(22) Filed: Jun. 23, 2015

(65) Prior Publication Data

US 2015/0369494 A1    Dec. 24, 2015

(30) Foreign Application Priority Data

Jun. 24, 2014   (EP) .................................... 14173714

(51) Int. Cl.
    *F24F 11/06*       (2006.01)
    *F24D 19/10*       (2006.01)

(52) U.S. Cl.
    CPC ..... *F24D 19/1006* (2013.01); *F24D 19/1012* (2013.01); *F24D 19/1015* (2013.01); *Y02B 30/745* (2013.01)

(58) Field of Classification Search
None
See application file for complete search history.

(56) References Cited

U.S. PATENT DOCUMENTS 4,560,323 A * 12/1985 Orchard ................. F04B 9/107
                                                         417/27
7,992,403 B2 * 8/2011 Kim ....................... F24F 5/0046
                                                         165/45

(Continued)

FOREIGN PATENT DOCUMENTS

DE       34 17 935 A1    11/1985
DE       195 25 887 A1    1/1997

(Continued)

*Primary Examiner* — Ljiljana Ciric
(74) *Attorney, Agent, or Firm* — McGlew and Tuttle, P.C.

(57) ABSTRACT

A method and a heat transfer system for limiting a supply flow ($q_S$) in a heat transfer system which includes a supply conduit (10) with a supply flow ($q_S$) and with a supply entry temperature ($T_S$), and at least one load circuit (2) with a load pump (20) which provides a load flow ($q_L$) with a load entry temperature ($T_L$) and a load exit temperature ($T_R$). The load entry temperature ($T_L$) is set by way of changing the supply flow ($q_S$), wherein the supply flow ($q_S$) is limited to a maximal flow ($q_S$, max), taking into account at least one temperature detected in the load circuit (2).

20 Claims, 8 Drawing Sheets

(56) References Cited

U.S. PATENT DOCUMENTS

| | | | |
|---|---|---|---|
| 2003/0024685 A1* | 2/2003 | Ace | F24T 10/10 |
| | | | 165/45 |
| 2011/0019325 A1* | 1/2011 | Nakamura | H02H 6/005 |
| | | | 361/93.8 |
| 2011/0114284 A1* | 5/2011 | Siegenthaler | F25B 30/06 |
| | | | 165/45 |
| 2013/0037249 A1* | 2/2013 | Manzo | F24D 19/1006 |
| | | | 165/200 |
| 2014/0261714 A1* | 9/2014 | Burt | G05D 23/1919 |
| | | | 137/10 |
| 2015/0089963 A1* | 4/2015 | Tan | F24F 11/83 |
| | | | 62/56 |
| 2015/0354849 A1* | 12/2015 | Matsuo | F28F 27/00 |
| | | | 62/79 |
| 2016/0273787 A1* | 9/2016 | Baasch Sorensen | G05B 9/02 |

FOREIGN PATENT DOCUMENTS

| | | | | |
|---|---|---|---|---|
| DE | 199 12 588 A1 | 9/2000 | | |
| EP | 0 729 086 A2 | 8/1996 | | |
| EP | 2874039 A1 * | 5/2015 | | F24D 5/04 |
| EP | 2985536 A1 * | 2/2016 | | F04B 49/065 |
| EP | 2985536 B1 * | 4/2018 | | |

* cited by examiner

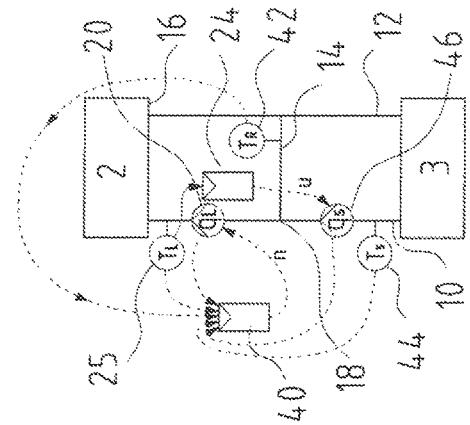
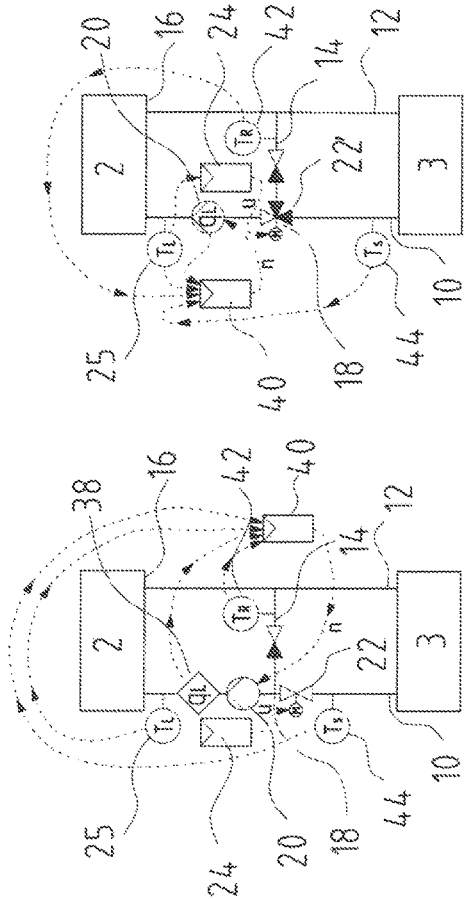
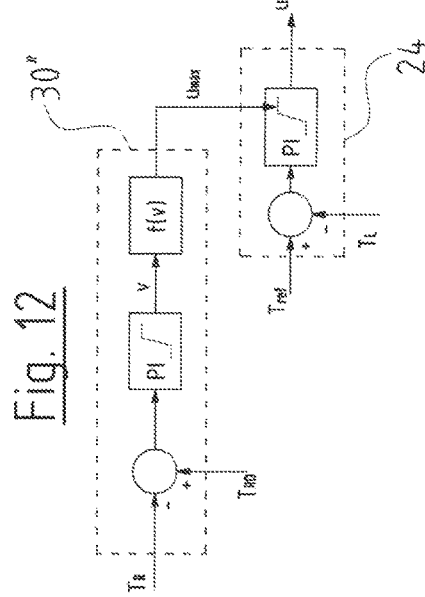

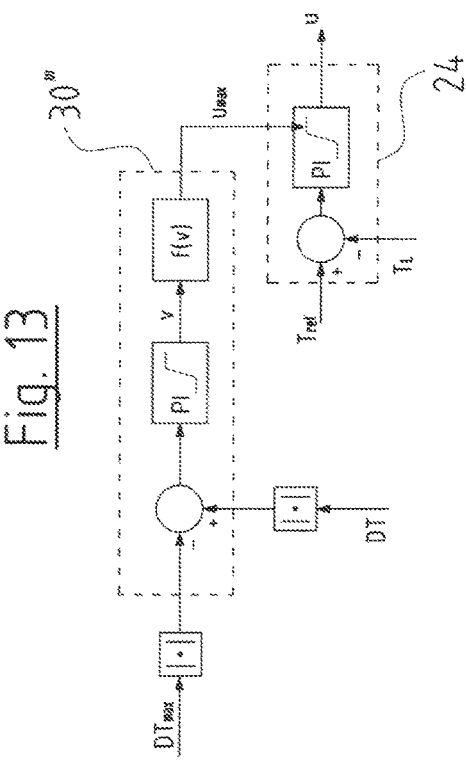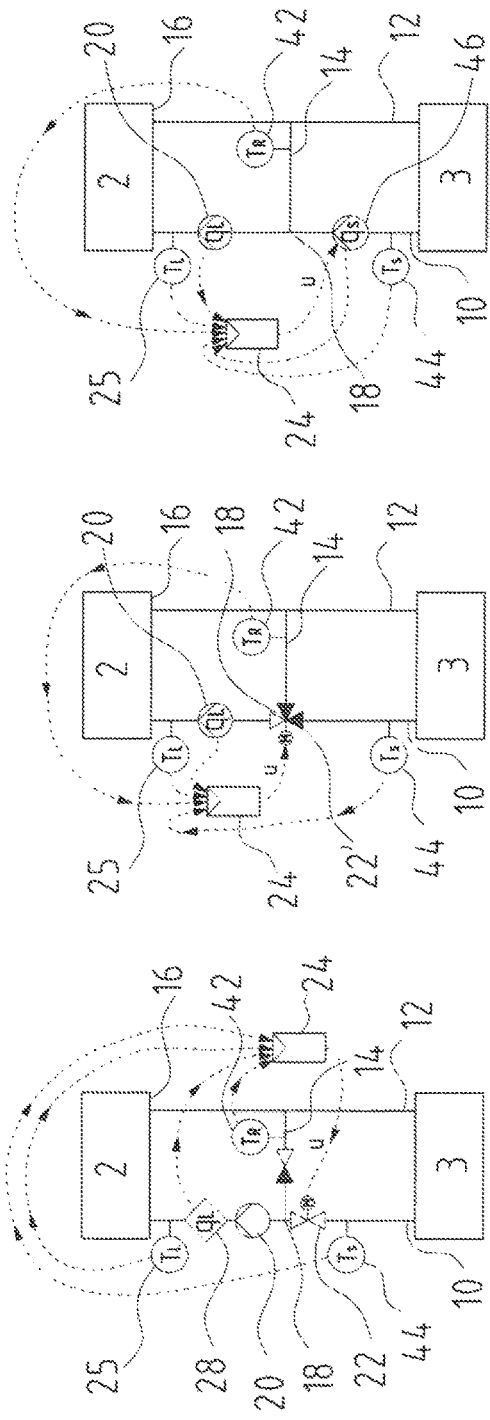

METHOD FOR LIMITING A SUPPLY FLOW IN A HEAT TRANSFER SYSTEM

CROSS REFERENCE TO RELATED APPLICATIONS

This application claims the benefit of priority under 35 U.S.C. § 119 of European Patent Application 14 173 714.8 filed Jun. 24, 2014, the entire contents of which are incorporated herein by reference.

FIELD OF THE INVENTION

The invention relates to a method for limiting a supply flow in a heat transfer system as well as in a heating or air-conditioning installation, as well as to such a heat transfer system.

BACKGROUND OF THE INVENTION

In heating installation with several heating circuits, for example floor heating systems with several heating circuits for example, there exists the problem of providing a hydraulic balancing between the several heating circuits. For this, it is known to provide a balancing valve in each heating circuit, with which balancing valve the flow through the respective heating circuit, i.e. in particular the supply flow through the heating circuit, can be limited. This arrangement has the disadvantage that the setting is only optimal for one design point of the installation due to the fixedly preset opening degree of the balancing valves. In operational conditions deviating from the design point, the setting as a rule leads to an increased energy consumption of the delivery pumps. Moreover, the setting of such balancing valves requires quite some effort. Valves which are closed-loop controlled with regard to differential pressure can also be used instead of balancing valves to be set manually. These however are mechanically complicated and thus expensive.

SUMMARY OF THE INVENTION

With regard to this state of the art, it is an object of the invention, to provide a method for limiting a supply flow in a heat transfer system, as well as a corresponding heat transfer system, which permits a simplified and improved hydraulic balancing between several heating circuits.

The method according to the invention serves for limiting a supply flow in a heat transfer system such as a heating or cooling system or an air-conditioning installation for example. The heat transfer system thereby comprises at least one supply conduit with a supply flow. This supply conduit in the supply flow feeds a heat transfer medium, for example water, to a load circuit. With a heating installation, the supply conduit can extend in a manner departing from a heat source, such as a heating boiler, heat storage means or e.g. a solar-thermal installation. In the case of a cooling installation, the supply conduit can extend for example in a manner departing from a cooling or refrigeration machine. The supply conduit thereby preferably forms part of a circulation, i.e. the heat transfer medium is led again via a return to the heat source or to the cold source.

The supply flow has a supply entry temperature in the supply conduit. This is the temperature, at which the supply flow is led departing from a heat source or cold source. The heat transfer system moreover comprises at least one load circuit, preferably several load circuits which in particular are connected in parallel. The at least one load circuit comprises a load pump which delivers the heat transfer medium, for example a fluid such as e.g. water, which is fed as a supply flow through the supply conduit, further through the load circuit. With regard to the load pump, it is preferably the case of an electromotorically driven circulation pump assembly. Further preferably, it is the case of a circulation pump assembly which can be electronically closed-loop controlled in its speed. If several load circuits are present, then each load circuit preferably has at least one load pump which is preferably designed in the mentioned manner. The load pump ensures a load flow through the load circuit, wherein the load flow has a load entry temperature and a load exit temperature. The load entry temperature prevails at the entry side of the load circuit, and the load exit temperature at the exit side of the load circuit. The load entry temperature according to the invention is set by way of changing the supply flow. I.e. the supply flow is closed-loop controlled, which is to say regulated, for example by way of a pump or a valve, in order to lead such a quantity of heat transfer medium to the load circuit, that the desired load entry temperature can be made available. In the case of a heating installation, thus a certain quantity of heating medium per time, i.e. a certain supply flow is fed to the load circuit, in order to set the desired load entry temperature.

According to the invention, one now envisages setting or closed-loop controlling the supply flow not only in dependence on the desired load entry temperature, but additionally limiting the supply flow to a maximal flow in dependence on at least one temperature detected in the load circuit. This function permits a hydraulic compensation, since on the one hand a supply flow can be set in a temperature-dependent manner, and one the other hand the supply flow is not throttled in a permanently set manner, as is the case with a balancing valve. Thus, a more optimal adaptation to different operating conditions is possible. Moreover, one can simultaneously make do without complicated valves, such as differential pressure valves, since the limitation to a maximal flow in dependence on a detected temperature in accordance with the invention can preferably be achieved with the actuation and closed-loop control elements in the heat transfer system which are present in any case. With this, preferably no additional mechanical components such as valves etc. are necessary. Inasmuch as this is concerned, according to the invention, it is indeed preferable not to detect the supply flow itself in a direct manner, but indirectly on basis of further values and in particular on a temperature detected in the load circuit. The thus determined or estimated supply flow can then be compared with a desired maximal value and, as the case may be, be limited to this maximal value by way of changing the settings of the heat transfer system. In this way, it is ensured that a certain maximal supply flow is not exceeded, for each load circuit, by which means a thermal and hydraulic balance can be achieved between several load circuits. The limiting of the supply flow can thereby be effected directly or indirectly by way of changing parameters influencing the supply flow.

The setting of the supply flow is preferably effected individually for each load circuit, wherein preferably an individual control device for setting the supply flow is provided for each load circuit, said control device likewise assuming the limitation of the supply flow in the described manner.

Preferably, the heat transfer system comprises at least one heat exchanger between the supply conduit and the load circuit. Such a heat exchanger comprises two flow paths, wherein a first flow path is connected to the supply conduit and thus can form part of a supply circuit, whereas a second flow path is part of the load circuit. Then a heat transfer from the first flow path onto the second flow path or in the reverse direction in the case of a cooling installation is possible in the heat exchanger. The supply flow and the load flow are completely separated from one another by way of the heat exchanger, and a temperature change in the load circuit is possible by way of change of the flow in the supply circuit.

The supply flow which is fed to the heat exchanger can be set or closed-loop controlled via a valve and/or a pump, in order to set the heat quantity which is fed to the heat exchanger.

Alternatively or additionally, the heat transfer system can comprises at least one mixing device which mixes a load exit flow at least partly with the supply flow. Likewise, a heat transfer from the supply flow to the load flow can be effected via such a mixing device, wherein for this a part of the supply flow merges into the load flow. A part of the return, i.e. the load exit flow, at least partly can be admixed to the supply flow at the entry side of the load circuit, for setting the temperature in the load circuit. Thus, the load entry temperature of the supply flow can be reduced in a heating system by way of a colder heat transfer medium. Conversely, the temperature at the entry of the load circuit can be increased with an air-conditioning installation. The mixing ratio hereby can also be set by way of direct or indirect closed-loop control of the supply flow. Thus, the supply flow can be set for example by way of a pump and/or valve. Heat transfer medium is admixed out of the load exit flow via a mixing device, if the thus set supply flow is smaller than the load flow.

If the load pump is an electromotorically driven circulation pump assembly as described above, and the mixing device for setting the mixing ratio additionally comprises a valve or an additional pump, then this design permits the load flow to be closed-loop controlled independently of the set mixing ratio.

The supply flow is preferably set on the basis of the load flow and one or more temperature signals which are determined in the heat transfer system, in particular on basis of the supply entry temperature, the load entry temperature and the load exit temperature. Thereby, the supply entry temperature is the temperature of the supply flow in front of the entry into the load circuit, i.e. in front or upstream of a heat exchanger and/or a mixing device. The load entry temperature is the entry temperature at the entry side, i.e. preferably at the exit side of a heat exchanger and/or of a mixing device. The load exit temperature is the temperature at the exit side of the load circuit. This temperature can correspond to a supply exit temperature, i.e. to the temperature in the return of a supply circuit. The load flow is detected in the heat transfer system or in the load circuit. For this, a flow sensor can be provided. Preferably, the load flow is however determined or detected via the load pump. The load flow can be indirectly determined in the load pump, in particular on the basis of electrical variables which are determined in an electrical drive motor of the load pump. Additionally, a pressure value, in particular the pressure difference across the load pump can be used to indirectly determine the load flow. The supply flow can be indirectly determined on the basis of this load flow whilst simultaneously taking the mentioned temperatures into account, without having to measure this supply flow in a direct manner. For example, the supply flow can be determined on the basis of the following equation:

$$q_S = \frac{T_L - T_R}{T_S - T_R} \cdot q_L$$

wherein $q_S$ is the supply flow, $q_L$ the load flow, $T_L$ the load entry temperature, $T_R$ the load exit temperature and $T_S$ the supply entry temperature. Thus, it is possible to determine the supply flow on the basis of readings which as a rule are detected in any case in known systems, so that one can make do without additional sensors.

The limiting of the supply flow can preferably be effected indirectly by way of at least one of the following measures:
  limiting the thermal power flow in the load circuit,
  limiting the load exit temperature,
  limiting the difference between the load exit temperature and the load entry temperature.

Thereby, a combination of several measures can be realized. The individual measures mean that a maximum for the supply flow does not need to be ascertained directly, but rather a maximum for one of the other mentioned variables, specifically for example for the thermal load flow in the load circuit, for the load exit temperature and/or a difference between the load exit temperature and the load entry temperature is ascertained. If one of these maximal values is exceeded, the supply flow can accordingly be indirectly reduced by way of limiting these variables. Such an indirect limitation of the supply flow by way of limiting variables which are dependent on the supply flow is seen as a limitation of the supply flow to a maximum flow in the context of the definition mentioned above.

According to a preferred embodiment, for at least two input variables, in each case a maximal supply flow or a variable which is monotonically related to the maximal supply flow is determined on the basis of one of the input variables, and one of the thus determined maximum supply flows is subsequently selected for limiting the supply flow. This means that for example a maximal supply flow or a variable which is monotonic related to this, for example a pump speed for a supply pump or a valve opening degree for a valve in the supply conduit is firstly determined for example after several of the measures mentioned above. In this manner, firstly several maximal supply flows or variables which are monotonic related thereto are determined according to different methods or on the basis of different input parameters. In the next step, then one of these maximal supply flows can be selected, in order to actually limit the supply flow to this. Thereby, for example the greatest determined maximal supply flow or the lowest maximal supply flow or a variable which is monotonic related to this can be selected, in order to limit the supply flow. This can be effected in a selection device or a selection step, in which one of several determined maximal supply flows, for example always the greatest or always the lowest, is selected according to set principles.

Further preferably, the supply flow is limited by way of limiting the speed of the load pump, the speed of a supply pump and/or by way of limiting an opening degree of a valve. With regard to the mentioned pumps, it is usefully the case of electromotorically driven circulation pump assemblies with which the speed can preferably be set. Thus, for example, the load pump can serve for producing a load flow, wherein the supply flow can also be influenced by way of speed change of the load pump. This is particularly the case with the use of a mixing device, where the regulation or the control insures a predetermined input load temperature, and in which the supply flow is mixed with a part of the return from the load circuit. A mixing conduit can be present for this, which connects the exit of the load circuit to a mixing point in the supply conduit. A valve can be arranged in the supply conduit upstream of this mixing point or in the return conduit downstream of the branching of the mixing conduit, in order to reduce the supply flow. Thus, the speed of a supply pump can be set in a direct manner and the supply flow can be limited by way of the limitation of the speed, if this supply pump is arranged in the supply conduit, for example with the use of a heat exchanger. If a valve is used in a supply conduit instead of a supply pump, then a limitation can be effected by way of limitation of the opening degree of this valve.

Such a valve or a previously described supply pump can be arranged either in the supply conduit either in the entry-side supply conduit or in the return, in the supply conduit.

According to a further preferred embodiment, the supply flow is not directly, but indirectly limited by way of limiting a control variable (control input) of a pressure or temperature controller. Such a pressure or temperature controller can be provided, in order to closed-loop control the load flow and/or supply flow in dependence of a pressure or a differential pressure or a temperature or a temperature difference. I.e. the load flow and/or supply flow is varied, in order to maintain a pressure value or temperature value at a desired value (setpoint). Thereby, the output signal of such a controller, specifically the control variable, can for example be the speed of a pump, for example of the supply pump or the load pump, or the opening degree of a valve. This control variable can be limited, in order to this limit the supply flow.

Preferably, the supply flow is limited by way of limiting a control variable of a control loop which closed-loop controls a load temperature and/or a load pressure in the load circuit, in particular a differential pressure across the load pump. Thus, for example, the speed of the load pump of the mentioned control loops can be limited, in order to limit the supply flow in the desired manner. Accordingly, the speed of a supply pump and/or the opening degree of a supply valve in the supply conduit or in the return of the supply conduit or of a supply circuit could also be limited when regulating/controlling the load temperature.

The subject-matter of the invention, apart from the previously described method, is also a heat transfer system, in which in particular the previously described method can be applied, as the case may be, with one or more of its preferred embodiments. The heat transfer system can for example be a heating installation, in which heat is transferred from a heat source, for example a heating boiler, to a consumer, on which a load circuit is arranged. Alternatively, it can be the case of an air-conditioning or cooling installation, with which conversely heat is transferred from a consumer via a load circuit applied on this, to a cold source. A combined installation is also possible.

The heat transfer system according to the invention comprises a supply conduit for connection to a fluid supply, and a return conduit for connection to a fluid return. The return conduit and the supply conduit together can form a supply circuit. The fluid supply thereby, as described, is effected from a heat source or a cold source, depending on whether it is the case of a heating system or a cooling system. A suitable heat transfer medium, for example water or, as the case may be, also oil or another heat transfer medium or refrigerant can also be provided as a fluid. Moreover, at least one load circuit is provided with a load pump which is arranged in this. The load pump ensures a load flow through the load circuit. With regard to the load pump, it is preferably the case of an electromotorically driven circulation pump assembly. Particularly preferably, several load circuits arranged parallel to one another and each with a load pump are provided, wherein the load pumps are preferably each designed as electromotorically driven circulation pump assemblies with controls or regulations which are further preferably independent of one another. These load circuits for example can be several circuits of a floor heating installation or several heating circuits of a building to be temperature-controlled. Moreover, a flow control device for closed-loop controlling a supply flow in a supply conduit is provided. Thereby, it is to be understood that the flow control device can be provided in the supply conduit and/or the return conduit. The flow control device is thereby designed in a manner and can for example be a supply pump or a mixing valve or supply valve, which closed-loop controls the flow in the supply conduit and/or the return conduit. The flow control device is designed in a manner such that it regulates a load entry temperature at the entry of the load circuit by way of regulation of the supply flow. The fed heat quantity to the load circuit can be changed or the heat quantity led away from the load circuit can be closed-loop controlled in a cooling/refrigeration installation or cooling application, by way of changing the supply flow. Thus for example in a heating system the supply flow can be increased for increasing the load entry temperature, and the supply flow can be reduced for reducing the load entry temperature. Conversely, the supply flow can be increased in a cooling system for reducing the load entry temperature.

Each load circuit preferably comprises its own flow regulation device, in the case that several parallel load circuits are present. The flow regulation devices thereby preferably closed-loop control the individual load circuits independently of one another.

According to the invention, one further envisages at least one temperature sensor detecting a temperature of the load flow being arranged in the at least one load circuit. Moreover, according to the invention, at least one limitation controller is provided, or a limitation device, which is designed in a manner such that it directly or indirectly limits the supply flow to a predefined maximum in dependence on at least one temperature signal from the at least one temperature sensor. Thereby, preferably, each load circuit has its own limitation controller or its own limitation device. The limitation of the supply flow to a predefined maximum in dependence on at least one temperature signal means that in the described heat transfer system, the supply flow is not detected in a direct manner, but is merely closed-loop controlled or set indirectly, specifically in dependence on or on the basis of the signal from the at least one temperature sensor. Thus preferably, an indirect determining of the supply flow is effected, and this flow is then limited as the case may be, so that it does not exceed a maximal value which is preset. With several load circuits, thus a hydraulic balancing can be created, since it is ensured that the supply flows to the individual load circuits in each case cannot exceed predefined maxima. Despite this, the heat transfer medium essentially requires no additional mechanical components, in particular no special limitation valves or balancing valves, and preferably also no device for the direct evaluation of the supply flow. A superordinate control or regulation which commonly sets or closed-loop controls the supply flows of several load circuits in a manner dependent on one another, in order to achieve a hydraulic compensation is moreover preferably also not necessary. However, as an alternative, a central control can also be provided additionally to the control according to the invention, wherein this central control for example specifies limit values for the individual load circuits, i. e. in particular for the supply flows of the individual load circuits.

According to a preferred embodiment, the heat transfer system comprises a heat exchanger between the supply conduit and the load circuit. This heat exchanger can comprise two flow paths, wherein a first flow path runs from the supply conduit to the return conduit, and through which the supply flow flows. The load circuit or the load flow of the load circuit flows through the second flow path, so that a heat transfer from the supply flow to the load flow or in the case of a refrigeration or cooling system, in the reverse direction is possible. Alternatively or additionally, the heat transfer system can comprise a mixing conduit or a mixing device. This, in particular, can be a mixing conduit which at a mixing point connects the exit of the load circuit to the supply conduit. Thus at least a part of the exit-side load flow can be admixed via the mixing conduit at the mixing point, to the supply flow in the supply conduit flowing to the entry of the load circuit, in order to be able to set the temperature at the entry of the load circuit, i.e. the load entry temperature. Thus, in the case of a heating system, a part of a colder return flow can be admixed to the supply flow, in order to reduce the feed temperature. Conversely, in the case of a cooling system, the feed temperature can be increased by way of admixing a part of the warmer return flow.

The heat transfer system according to the invention further preferably comprises at least one pressure controller and/or temperature controller for the load circuit, wherein this controller is coupled to the limitation controller in a manner such that a control variable in the pressure and/or temperature controller can be limited by the limitation controller to a maximal value. The pressure and/or temperature controller, as has been described above by way of a preferred embodiment of the method, preferably for example controls or regulates the speed of a supply pump, the opening degree of a valve in the supply conduit or return conduit and/or the speed of the load pump, in order to maintain the pressure or a pressure difference and/or the temperature at a desired value by way of speed change or change of the valve opening degree. The control variable of the controller, for example the pump speed to be set or the valve opening degree can be limited by the limitation controller to a maximal value, in order to this indirectly limit the supply flow to a maximal value.

Further preferably, the limitation controller is designed in a manner such that it compares a thermal power flow in the load circuit and/or the load exit temperature and/or a difference between the load exit temperature and the load entry temperature with an associated limit value and defines a maximum for a variable for setting the supply flow. In the case of a heating system the limit value is a maximal value and in the case of a cooling system the limit value is a minimum value. Thus, the supply flow can be limited on the basis of different or several input variables. These input variables can be the thermal power flow or heat flow in the load circuit, the load exit temperature and/or a difference between the load exit temperature and the load entry temperature. The temperatures can be determined in a direct manner. The heat flow or the thermal power flow is preferably determined form the load flow and the load entry temperature as well as the load exit temperature. The limitation controller can be designed such that it independently determines the maximum for the supply flow or a variable for setting the supply flow, i.e. a maximum of this variable, on the basis of several of the mentioned input variables. Thus, several maxima are determined for the supply flow or for a variable for setting the supply flow. A value for the actual limitation of the supply flow can be selected from these several maxima, specifically for example the largest determined maximum or the smallest determined maximum. This can be effected by way of a selection device or a selection controller. The variable for setting the supply flow can for example be the speed for a pump, for example of the supply pump or load pump, or a valve opening degree.

According to a further preferred embodiment, the at least one temperature sensor is a temperature sensor which is arranged at the entry of the load circuit and detects a load entry temperature, or a temperature sensor which is arranged at the exit of the load circuit and detects a load exit temperature. With the load entry temperature and the load exit temperature it is the case of temperatures of the fluid in the load flow at the entry and exit respectively, of the load circuit. Also, two temperature sensors can be provided, in order to detect the load entry temperature as well as the load exit temperature.

The flow control device, as already specified above, preferably comprises at least one supply pump closed-loop controlling the supply flow (supply flow rate) and/or a supply valve closed-loop controlling the supply flow, and these can either be arranged in the supply conduit or the return conduit. With regard to the supply pump, it is preferably the case of an electromotorically driven circulation pump assembly.

According to a particularly preferred embodiment, the load pump is related for detecting a flow through the load circuit, i.e. for detecting the load flow, and preferably with the flow control device is designed for transmitting a signal corresponding to the detected flow. Thus, one can make do without a separate flow measurement device or a flow sensor for the direct detection of the load flow. The load flow in contrast can be derived from other variables, for example from the speed, the pressure difference and the electrical power uptake of the drive motor of the load pump.

Preferably, each load circuit has a flow control device and/or a limitation controller in the previously described manner, in the case that several parallel load circuits are provided, wherein the controllers of the individual load circuits are preferably designed such that they operate independently of one another without a superordinate central control or regulation.

Particularly preferably, the flow control device and/or the limitation controller are integrated into a load pump assembly forming the load pump. Thus, one can make do without a separate control device and all components which are necessary for the closed-loop control (regulation) and in particular limitation of the supply flow, in particular the control or regulation components, can be integrated into the load pump assembly. This is particularly advantageous if the load flow is also determined or detected in the load pump assembly itself, so that no lead connections to external sensors are necessary here.

The invention is described hereinafter by way of example and by way of the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIG. 9a is a schematic view showing an example for a heat transfer system with mixing loops according to the invention;

FIG. 9b is a schematic view showing another example for a heat transfer system with mixing loops according to the invention;

FIG. 9c is a schematic view showing another example for a heat transfer system with mixing loops according to the invention;

FIG. 12 is a control diagram showing an example of coupled controllers for limiting the return temperature by way of limiting a control variable in a temperature controller;

FIG. 13 is a control diagram showing coupled controllers for limiting the temperature difference in a mixing loop by way of limiting a control variable in a temperature controller;

FIG. 14a is a schematic view showing an example of a heat transfer system in mixing loops according to the invention;

FIG. 14b is a schematic view showing another example of a heat transfer system in mixing loops according to the invention; and FIG. 14c is another example of a heat transfer system in mixing loops according to the invention;

DESCRIPTION OF THE PREFERRED EMBODIMENTS

Figure 1:
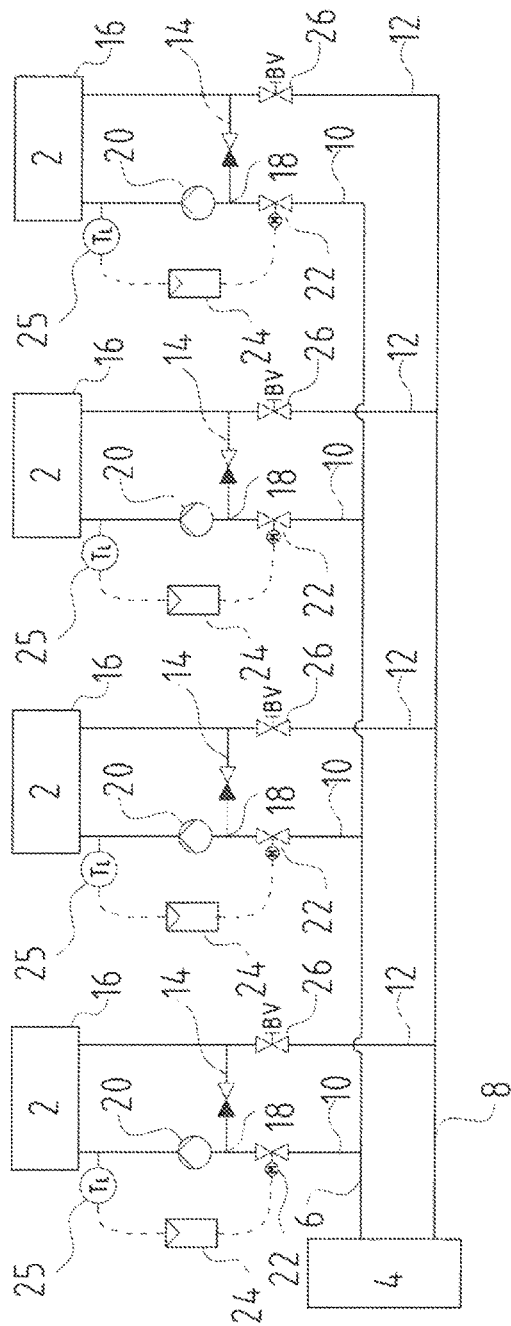
FIG. 1 is a heat transfer system, as is known from the state of the art.

Referring to the drawings, FIG. 1 shows a conventional heat transfer system with four heating circuits, for example heating circuits of a floor heating. The four heating circuits each have heat transfer means for locations to be temperature-controlled, in the form of load circuits 2. These are supplied by a heat source 4 via a supply 3 or a supply circuit, which comprises a feed 6 and a return 8. Supply conduits 10 lead from the feed 6 to the individual load circuits 2, and accordingly return conduits 12 lead back to the return 8 of the supply circuit. In this case, mixing devices are provided in the supply to the load circuits 2, for the closed-loop control of the feed temperature in the load circuits 2 at the entry, i.e. of the load entry temperature $T_L$. These mixing devices consist of a mixing connection or a mixing conduit 14 which connects the exits 16 of the load circuits 2 to a mixing point 18 in the supply conduit 10. The load circuits in each case comprise a load pump 20 which produces a load flow through the load circuit 2, i.e. delivers the heat transfer medium through the load circuit 2. The load pump 20 is thereby an electromotorically driven circulation pump assembly. Thereby, the load pump 20 lies downstream of the mixing point 18, so that the flow through the load pump 20 comprises heat transfer medium or fluid from the mixing conduit 14 as well as from the supply conduit 10. In this manner, a mixing flow can be admixed through the mixing conduit 14 from the exit or return of the load circuit 2, to the supply flow in the supply conduit 10 which is likewise produced by the load pump 20, in order to reduce the feed temperature at the entry side, i.e. the load entry temperature $T_L$ with respect to the temperature in the feed 6 of the supply circuit.

The setting of the mixing ratio is effected via a mixing valve 22 which is activated via a temperature controller 24. For this, the mixing valve 22 can be adjusted in its opening degree for example in an electromotoric manner. The temperature controller 24 detects a temperature signal corresponding to the load entry temperature $T_L$, from a temperature sensor 25. In the example shown here, the mixing valve 22 is arranged in the supply conduit 10 upstream of the mixing point 18. The mixing valve however alternatively could also be arranged in the return conduit 12 downstream of the branching of the mixing conduit 14. If the load pump 20 delivers a predefined delivery flow, i.e. load flow, on closure of the mixing valve 22, then the supply flow in the supply conduit 10 is reduced and the difference to the load flow is sucked via the mixing conduit 14, so that a mixing flow in the mixing conduit 14 increases. If the load entry temperature $T_L$ is to be increased, the mixing valve 22 is opened via the temperature controller 24, so that the supply flow in the supply conduit 10 increases, and accordingly the share of the load flow which is made available via the mixing conduit 14 from the return reduces.

It is to be understood that the same system would also function in a cooling system, with which a cold source is provided instead of a heat source 4. In such a system, the mixing device with a mixing conduit 14 would not serve for reducing the feed temperature, but conversely for increasing the feed temperature by way of admixing the heat transfer medium from the return.

With the known arrangement, as is shown in FIG. 1, moreover balancing valves 26 are arranged in the return conduits 12 downstream of the branching of the mixing conduit 14. The balancing valves 26 serve for the hydraulic balancing between the several load circuits, by way of then limiting the maximal supply flow through the supply conduit 10 and the return conduit 12 for the individual load circuit. These valves are set manually. This, on the one hand, requires some effort and on the other hand there exits the problem that an optimal setting can only be achieved for one design point, and thus no optimal setting is given in other operating conditions, and the balancing valves 26 act as unnecessary throttles, which demands an increased power from the pumps in the system.

According to the invention, this disadvantage is avoided, since the balancing valves 26 are done away with in the system according to the invention. The limitation of the supply flow $q_S$ in the supply conduit 10 for the hydraulic balancing between the several load circuits 2 in contrast is achieved by way of an electronic closed-loop control (regulation) of the valves and pumps which are present in any case and which set the supply flow, i.e. for example by way of a suitable control or regulation of the load pump 20 and/or of the mixing valve 22.

According to the invention, for this, one envisages not having to directly detect the supply flow $q_S$, but rather determining the supply flow $q_S$ whilst taking into account at least one temperature value detected in the load circuit 2, and then limiting it to a maximal value as the case may be.

The computation or evaluation of the supply flow $q_S$ can be based on the following relationship between the supply flow $q_S$, the load flow $q_L$, load entry temperature $T_L$ at the entry side of the load circuit 2, the load exit temperature $T_R$ at the exit side 16 of the load circuit as well as the supply entry temperature $T_S$ in the supply conduit 10:

$$q_S = \frac{T_L - T_R}{T_S - T_R} \cdot q_L$$

I.e. the supply flow can be computed from this relationship with the knowledge of the load flow $q_L$ in the load circuit 2, as well as the previously mentioned temperatures at the entry side and at the exit side of the load circuit 2 as well as in the supply flow $q_S$ in the supply conduit 10, so that it does not need to be determined directly. The load flow $q_L$ for example, as explained further below, can be determined directly in the load pump 20 from operating parameters of the load pump 20.

Figure 2:
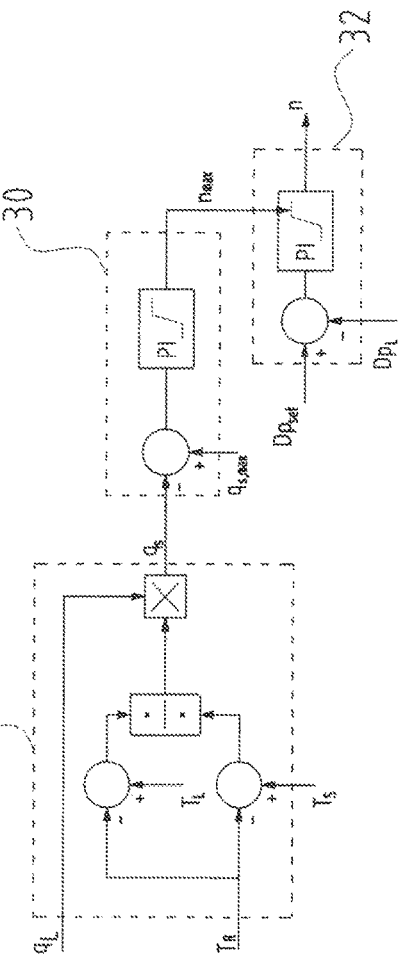
FIG. 2 is a control diagram showing an example of coupled controllers for limiting the supply flow by way of speed change of a pump.

FIG. 2 shows a first example of a combination of controllers for limiting the supply flow $q_S$ whilst taking into account the load flow $q_L$, the load entry temperature $T_L$, the load exit temperature $T_R$ as well as the supply entry temperature $T_S$. Thus, a supply flow evaluation module 28 is provided, in which the supply flow $q_S$ is determined from the previously mentioned variables according to the equation specified above. The thus determined supply flow $q_S$ is fed as an input variable to a limitation controller 30, in which the thus determined supply flow $q_S$ is compared with a predefined maximal supply flow $q_{S,max}$. In this example, the limitation controller 30 when reaching the predefined maximal delivery flow $q_{S,max}$ outputs a maximal speed $n_{max}$ which is led as a control variable to a pressure controller 32. The pressure controller 32 regulates the differential pressure across the load pump 20, i.e. between the entry and exit of the load pump 20. Thereby, it is the case of the differential pressure $Dp_L$ across the load circuit 2. This differential pressure is regulated to a differential pressure setpoint $DP_{set}$ by the pressure controller 32. The pressure controller 32 as an output variable outputs a speed n, with which the load pump 20 comprising a speed-controllable, electrical drive motor is operated. Thereby, the maximal speed $n_{max}$ which is set by the limitation controller is taken into account in a manner such that the speed n is limited to this maximal value. I.e. the load pump 20 is thus maximally operated with the maximal speed $n_{max}$ set by the limitation controller 30, so that the load flow $q_L$ and thus indirectly also the supply flow $q_S$ are limited when a temperature in the load circuit, for example the entry load temperature is controlled by adjusting the supply flow. This results from the thermal connection between the load flow and the supply flow. The supply flow results from the heat requirement of the load circuit.

With the arrangement of several load circuits, each of the load circuits comprises a controller as was previously described by way of FIG. 2.

Figure 3:
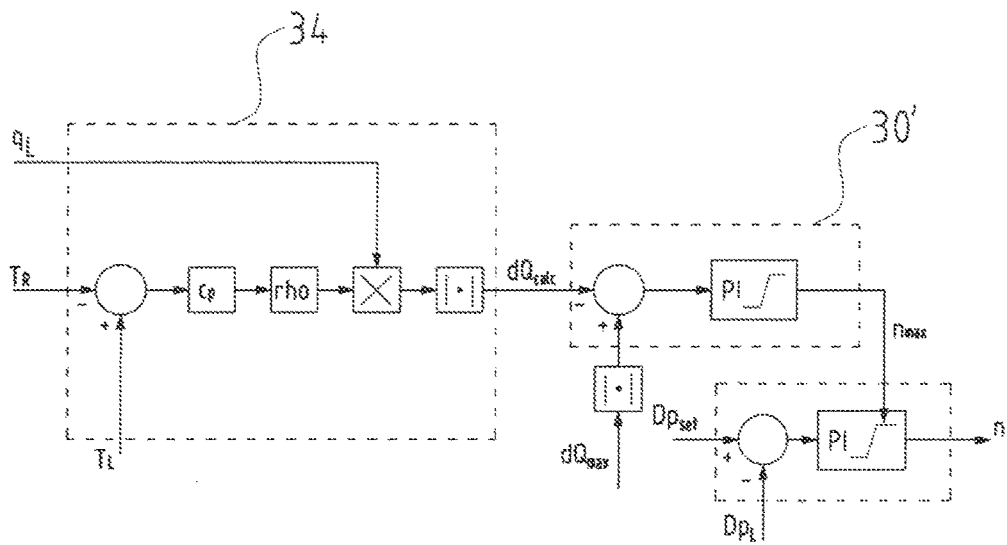
FIG. 3 is a control diagram showing an example of coupled controllers for limiting the heat flow and for limiting the speed of a pump.

FIG. 3 shows a further example of a coupling of several controllers, wherein here it is not directly the supply flow $q_S$ which forms the basis, but instead the heat flow $dQ_{calc}$ in a heat flow evaluation module 34. The load flow $q_L$, the load entry temperature $T_L$ as well as the load exit temperature $T_R$ are also taken into account for determining the heat flow $dQ_{calc}$. The absolute or complete heat flow $dQ_{calc}$ which is fed via the supply conduit 10 in the load circuit can thus be computed. This heat flow $dQ_{calc}$ in the limitation controller 30' is compared with a maximal heat flow $dQ_{max}$ which is predefined. The limitation controller 30', as is the case with the limitation controller 30, outputs a maximal speed $n_{max}$ for the load pump 20 and this maximal speed is then led to the pressure controller 32 as has been described above.

Thus a limitation of the supply flow $q_S$ is also achieved with the variant shown in FIG. 3, since the supply flow $q_S$ is also indirectly limited by the limitation of the speed of the load pump 20. The considered heat flow $dQ_{calc}$ according to the following equation is dependent on the load flow $q_L$ as well as the load entry temperature $T_L$ as well as the load exit temperature $T_R$:

$$Q_{calc} = |q_L \cdot rho \cdot c_p (T_L - T_R)|$$

Figure 4:
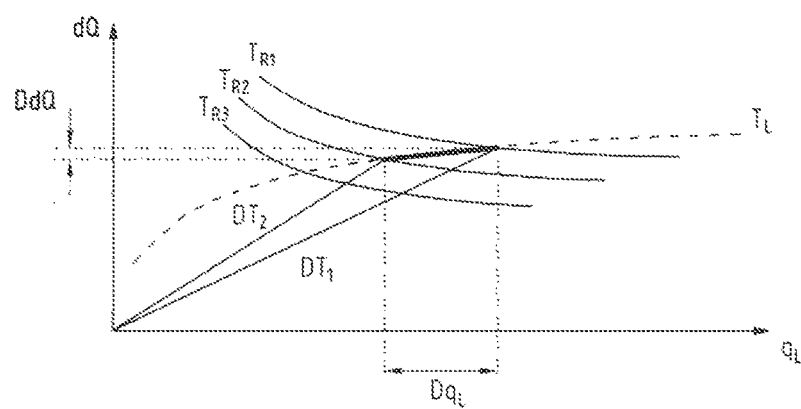
FIG. 4 is a view showing heat emission curves of a radiator.

In the above equation, $c_p$ is the specific heat capacity of the heat transfer medium, i.e. fluid, which flows through the system as a heat carrier. With rho, it is the case of density or mass density of this fluid. From the representation in FIG. 4, one can recognise that the load flow $q_L$ can be reduced or limited by way of limiting the heat flow $dQ_{calc}$. The lines $T_{R1}$, $T_{R2}$ and $T_{R3}$ in FIG. 4 display constant return temperature curves of a radiator or heat exchanger which e.g. can also be a floor heating circuit. If such a radiator is operated at a specific load entry temperature curve $T_L$, the load flow $q_L$ can be reduced by a relatively large amount $Dq_L$ by way of reducing the heat flow $dQ$ by the amount $DdQ$. Simultaneously, the return temperature or the load exit temperature reduces to the value $T_{R2}$, so that the magnitude of the term $T_L - T_R$ in the above mentioned equation increases. This shows that thus the load flow $q_L$ is also necessarily reduced. This means that by way of limiting the heat flow $dQ$ to a maximal value $dQ_{max}$, it is possible to limit the load flow $q_L$ to a maximal value, in order thus to create a hydraulic balancing.

As discussed above, the load flow can be determined directly in the load pump 20. This is effected by a computation or estimation on the basis of operating parameters of the load pump 20, specifically the current speed n and the pressure difference Dp across the load pump, or on the basis of the speed n and the taken-up electrical power P of the drive motor of the load pump 20.

Figure 5A:
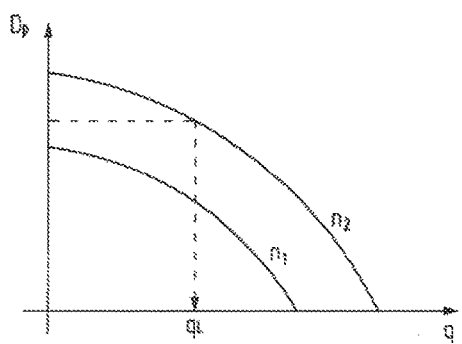
FIG. 5a is a pump curve for determining the flow at the pump.
Figure 5B:
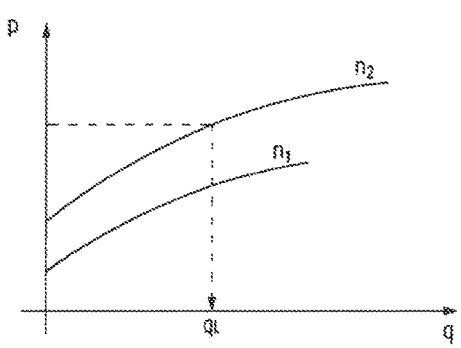
FIG. 5b is another pump curve for determining the flow at the pump.

FIG. 5a shows a diagram, in which the differential pressure Dp is plotted against the flow q for different speeds n1 and n2. It is to be recognized that with a known speed and with a known differential pressure Dp, one can compute the load flow $q_L$ if the shown pump curves are known. Accordingly, FIG. 5b shows the electrical power P plotted against the flow q. In this diagram too, known curves for the speeds n1 and n2 are drawn in. Here too, one can recognise that with known curves of the pump, the load flow $q_L$ can be determined from the speed n and the electrical power P. Thus, one can make do without a special flow sensor for detecting the load flow $q_L$.

Figure 6:
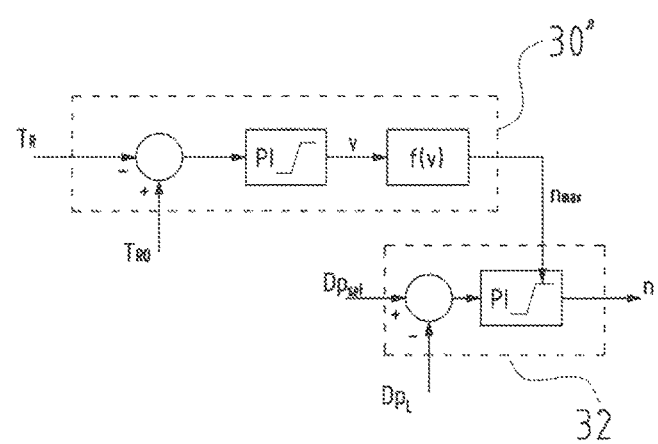
FIG. 6 is a control diagram showing an example of coupled controllers for limiting the return temperature by way of limiting a pump speed.

A third variant of the limitation of the supply flow $q_S$ in an indirect manner and which is in contrast to the controller arrangements shown in FIGS. 2 and 3 is possible by way of the controller arrangement shown by way of example in FIG. 6. Thus, the limitation controller 30" can limit the load exit temperature $T_R$ at the exit 16 of the load circuit 2 to a limit value $T_R0$. The limitation controller 30'' on reaching the limit value $T_R0$ issues a maximal speed $n_{max}$ to the pressure controller 32 which is designed in exactly the same manner as has been described by way of FIGS. 2 and 3.

Return temperatures, i.e. load exit temperatures $T_R$ at the exit 16 of the load circuit and which are too high and which would worsen the thermal efficiency of the system can be prevented in this manner.

Figure 7:
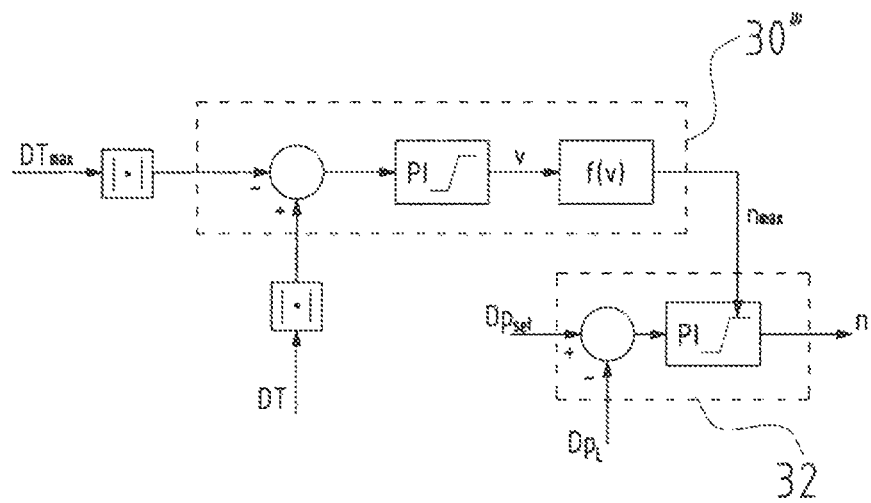
FIG. 7 is a control diagram showing a coupled controllers for limiting the temperature difference in a mixing loop by way of limiting a pump speed.

A further possibility of creating a hydraulic balancing between several load circuits can be achieved by the controller arrangement which is shown in FIG. 7. The temperature difference DT across the load circuit, i.e. the difference between the load entry temperature $T_L$ and the load exit temperature $T_R$ is held above or below a predefined limit value $DT_{max}$ with this controller. The load flow $q_L$ and, with this, as described above, also the supply flow $q_S$ will reduce with an increase of the absolute value of the temperature difference |DT|, so that an indirect limitation of the supply flow $q_S$ for the hydraulic balancing is possible via this. The values of the maximal temperature difference $DT_{max}$ as well as the detected temperature difference DT are taken into account as magnitudes without the sign (polarity), in the limitation controller 30''' which is shown in FIG. 7, so that this controller can be applied with the same design for heating systems as well as for cooling systems. If the temperature difference reaches the mentioned limit value $DT_{max}$, then the limitation controller 30''' outputs a maximal speed $n_{max}$ to the pressure controller 32, as has been described above by way of the FIGS. 2, 3 and 6. Thus, here too, the speed of the pump and thus the load flow $q_L$ and simultaneously the supply flow $q_S$ are limited.

Figure 8:
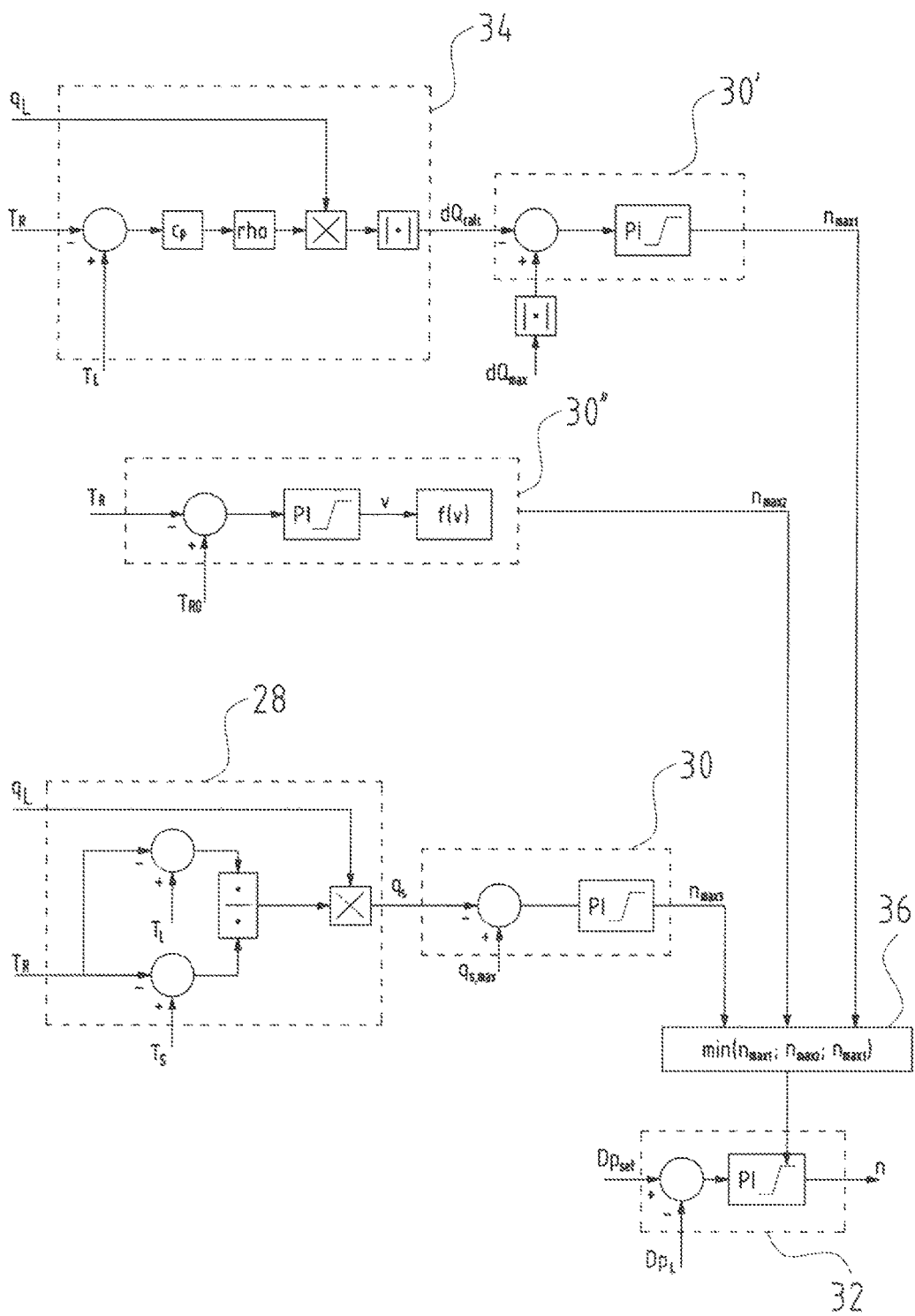
FIG. 8 is a control diagram showing a coupling of several different controllers for limiting the supply flow by way of limiting the speed of a pump.

FIG. 8 shows a combination of several of the previously described controllers.

Thus at the top in FIG. 8, firstly the heat flow evaluation module 34 with the limitation controller 30' is shown. The limitation controller 30'' of FIG. 6 is shown in the middle. The arrangement of the supply flow evaluation module 28 with the limitation controller 30 of FIG. 2 is shown at the bottom in FIG. 8. In this example, the limitation controller 30' outputs a maximal speed $n_{max}1$, the limitation controller 30'' a maximal speed $n_{max}2$ and the limitation controller 30 a maximal speed $n_{max}3$ for the load pump. These three maximal speeds $n_{max}1$, $n_{max}2$, and $n_{max}3$ are led to a selection controller 36 or a selection device 36, in which one of these several maximal speeds is selected. In the shown example, this is the smallest of the three maximal speeds $n_{max}1$, $n_{max}2$, and $n_{max}3$. As described by way of FIGS. 2, 6 and 3, this is then transferred to the pressure controller 32 as a control variable or maximal speed, so that the speed n issued by the pressure controller 32 is limited to the smallest value of the thus determined three maximal speeds $n_{max}1$, $n_{max}2$, and $n_{max}3$. Instead of selecting the smallest of these speeds in the selection controller 36, this can also be configured so that the largest of these three speeds is selected.

FIGS. 9a-9c show three examples for load circuits 2 with associated mixing loops of a heat transfer system, wherein it is to be understood that in each case several such arrangements of load circuits can be present in the heat transfer system. The arrangement in FIG. 9a corresponds essentially to the arrangement shown in FIG. 1. The supply 3 thereby comprises the feed 6 and the return 8 and here are represented only in a simplified manner. According to the invention, the balancing valve 26 in the return conduit 12 is done away with, in contrast to the embodiment example in FIG. 1. Apart from the load pump 20, here yet a flow sensor 38 which detects the load flow $q_L$, is arranged in the feed to the load circuit 2. Alternatively, the load flow $q_L$ can however also be determined directly in the load pump 20 as described above. Here too, a temperature controller 24 is provided, which controls the load entry temperature $T_L$ by way of setting the mixing valve 22 in the manner described by way of FIG. 1. The arrangement furthermore comprises a balancing controller in the form of a control module (regulation module) 40 for limiting the supply flow $q_S$ in the manner described above. The control module 40, as is represented in FIG. 9a, as input variables receives the load flow $q_L$, the load entry temperature $T_L$, the supply entry temperature $T_S$ as well as the load exit temperature $T_R$ which here is not detected directly at the exit 16 but in the mixing conduit 14 by a temperature sensor. The temperature sensor 42 for detecting the load exit temperature $T_R$ could however also be arranged at the exit 16. The temperature at the exit 16 corresponds essentially to the temperature in the mixing conduit 14. The supply entry temperature $T_S$ is detected by a temperature sensor 44 in the supply conduit 10. The controller 40 comprises a controller arrangement, as has been described by way of the FIGS. 2, 3, 6, 7 and/or FIG. 8., and via the pressure controller 32 likewise contained in the control module 40 issues the speed, at which the load pump 20 is operated. Since the speed n is limited to a maximal value by the mentioned control modules in the described manner, thus the supply flow $q_S$ is also limited to a maximum via the control module 40 in the manner described above.

FIG. 9b shows an alternative arrangement which differs from the design according to FIG. 9a in that the mixing valve 22' is arranged as a 3/2-way valve directly in the mixing point 18. The temperature controller 24 controls this mixing valve 22' for regulating the load entry temperature $T_L$. The additional control module 40 corresponds to the control module described by way of FIG. 9a. It is merely the case that here the load flow $q_L$ is not determined via a separate sensor, but via the load pump 20 or its operating parameters, as described above. Here too, the control module 40 carries out a limitation of the supply flow $q_S$ by way of limiting the speed n of the load pump 20, as described above.

A third variant of the load circuit 2 with a mixing loop of a heat transfer system according to the invention is shown in FIG. 9c. The embodiment shown there corresponds to the embodiment shown in FIG. 9b with the difference that the mixing valve 22' is done away with, and a supply pump 46 is arranged in the supply conduit 10 instead. The supply pump 46 is closed-loop controlled in its speed by the temperature controller 24, in order to control or regulate the load entry temperature $T_L$ to a predefined or desired value. I.e. the supply flow $q_S$ which is led to the mixing point 18, is closed-loop controlled via the supply pump 45. A mixing flow is additionally produced via the mixing conduit 14 by the load pump 20 if the load flow $q_L$ which is produced by the load pump 20, is larger than the supply flow $q_S$. Additionally, the control module 40 in the manner described above effects a limitation of the supply flow $q_S$, by way of it limiting the speed n of the load pump 20, as explained by way of FIGS. 2, 3, 6, 7 and/or 8. The load flow $q_L$ reduces if the speed n of the load pump 20 is limited or reduced in such a manner. If the supply pump 46 now firstly delivers an unchanged supply flow $q_S$, then this leads to the fact that the admixing or mixing flow via the mixing conduit becomes smaller and thus the load entry temperature $T_L$ increases. This then initiates the temperature controller 24 to reduce the supply flow $q_S$ again, in order to lower the temperature.

In this manner therefore, the supply flow $q_S$ is also indirectly reduced by the limitation of the speed n of the load pump 20.

Instead of setting the control variable of a pressure controller 32 via a limitation controller 30 as described above by way of FIGS. 2, 3, 6, 7 and 8 the control variable of the temperature controller 24 could also be influenced in the same manner as explained by way of FIGS. 10-13.

Figure 10:
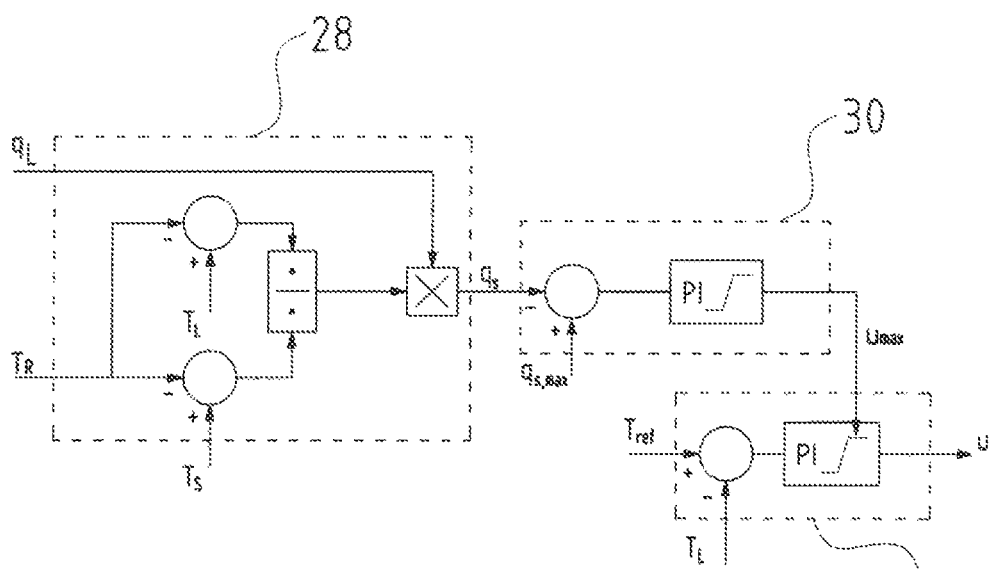
FIG. 10 is a control diagram showing an example for coupled controllers for limiting the supply flow by way of limiting a control variable of a temperature controller.

FIG. 10 shows the supply flow evaluation module 28, as has been explained by way of FIG. 2. A limitation controller 30 as has been described by way of FIG. 2 is moreover arranged at the exit side, and this limits the supply flow $q_S$ to a maximal supply flow $q_{S,max}$. In contrast to the embodiment example according to FIG. 2, the limitation controller 30 here as a control variable does not output a maximal speed, but a maximal control variable $u_{max}$ which is transferred to the temperature controller 24. The temperature controller 24 serves for regulating the load entry temperature to a desired temperature $T_{ref}$. For this, it outputs a control variable u which represents the valve opening degree of the valve 22, 22' or the speed of the supply pump $q_S$. This means that the temperature controller 24 limits the control variable u to the maximal control variable $u_{max}$ which is set by the limitation controller 30, so that the supply flow $q_S$ is thus indirectly limited with a corresponding setting of the mixing valve 22, 22' or of the supply pump 46.

Figure 11:
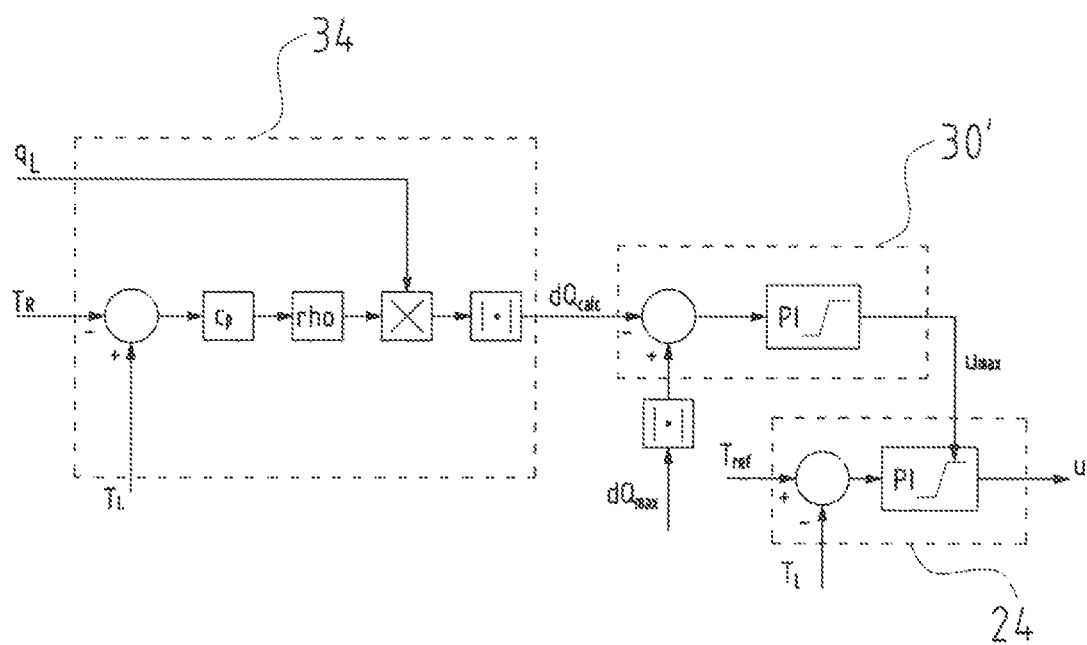
FIG. 11 is a control diagram showing an example of coupled controllers for limiting the heat flow by way of limiting a control variable of a temperature controller.

FIG. 11 shows a controller arrangement which corresponds to the controller arrangement according to FIG. 3, only that here the pressure controller 32 is likewise replaced by the temperature controller 24. The limitation controller 30' described above by way of FIG. 3, as previously described by way of FIG. 10, does not output a maximal speed, but a maximal control variable $u_{max}$, via which the control variable u is limited to this maximal value $u_{max}$ in the temperature controller 24 in the described manner.

FIG. 12 shows a controller arrangement which corresponds to the controller arrangement which has been described by way of FIG. 6, with the difference that here too, the pressure controller 32 is replaced by the temperature controller 24, to which a maximal control variable $u_{max}$ is led as a limiting control variable. The temperature controller 24 thus limits the outputted control variable u to this value.

FIG. 13 shows a controller arrangement which corresponds to the controller arrangement described by way FIG. 7, with the difference that here too, the pressure controller 32 is replaced by the temperature controller 24, to which a maximal control variable $u_{max}$ is led from the limitation controller 30''', as has been described above by way of the FIGS. 10-12.

With regard to the controller arrangements which are shown in the FIGS. 10, 11, 12 and 13 and have been described beforehand, it is to be understood that these too can be combined with one another in the manner as has been described by way of FIG. 8. A selection controller is then likewise provided, which selects the largest or smallest control variable from three maximal control variables $u_{max}1$, $u_{max}2$, and $u_{max}3$ and transfers it to the temperature controller 24.

FIGS. 14a-14c, in a manner similar to the FIGS. 9a-9c, show three embodiment examples of a part of a heat transfer system for realizing the closed-loop control principles which are described by way of FIGS. 10-13. Thereby, the design according to FIG. 14a basically corresponds to the arrangement according to FIG. 9a, the design according to FIG. 14b to the design according to FIG. 9b, and the design according to FIG. 14c to the design according to FIG. 9c. This, in particular, relates to the arrangement of the mixing valves 22 and 22' as well as of the supply pump 46 as well as of the temperature sensors and of the flow sensor 38. The description according to FIGS. 9a-9c is referred to with regard to this. Also, with regard to the arrangements which are shown in FIGS. 14a-14c, it is to be understood that preferably several such arrangements of load circuits 2 with associated mixing devices are arranged in a heat transfer system.

In contrast to the designs according to FIGS. 9a-9c, the arrangements according to FIGS. 14a-14c are designed in order to carry out the control or limitation method as has been described by way of FIGS. 10-13. I.e. here no control module 40 is provided, but the limitation is carried out by the temperature controller 24 in the manner described by way of FIGS. 10-13. Thereby, the regulating principles according to FIGS. 10-13 can be realized individually or in combination, for example in the form of a combined controller according to the arrangement in FIG. 8.

Otherwise, it is to be understood that the closed-loop control principle according to the invention could also be applied with heat transfer systems which use a heat exchanger instead of a mixing device. With such systems, a heat exchanger would be provided instead of the mixing conduit 14, wherein the supply flow $q_S$ flows through a first flow path of the heat exchanger via the supply conduit 10 and the return conduit 12, and the load flow $q_L$ through a second flow path through the load circuit 2. With such an arrangement, preferably a load pump 20 is provided in the load circuit, as well as a supply pump 46 in the supply circuit.

Particularly preferably, the necessary closed-loop control components, in particular the control module 40 and/or the temperature controller 24 are integrated preferably into the pump assembly forming the load pump 20, in particular into a terminal box or electronics housing of this pump assembly.

While specific embodiments of the invention have been shown and described in detail to illustrate the application of the principles of the invention, it will be understood that the invention may be embodied otherwise without departing from such principles.

APPENDIX

List of Reference Characters

2—load circuits
3—supply
4—heat source
6—feed
8—return
10—supply conduits
12—return conduits
14—mixing conduit
16—exit
18—mixing point
20—load pump
22, 22'—mixing valve
24—temperature controller
26—balancing valves
28—supply flow evaluation module
30, 30', 30", 30'''—limitation controller
32—pressure controller
34—heat flow evaluation module
36—selection controller
38—flow sensor
40—control module
42, 44—temperature sensors
46—supply pump
$c_P$—specific heat capacity of the heat transfer medium $q_L$—load flow
$q_S$—supply flow
$q_{S,max}$—maximal supply flow
n—speed
$n_{max}$—maximal speed
$T_R$—load exit temperature
$T_S$—supply temperature
$T_R$—load exit temperature, setpoint
$T_L$—load entry temperature
Dq—heat flow
$dQ_{calc}$—computed heat flow
$dQ_{max}$—maxima heat flow
rho—density of the heat carrier
$T_{ref}$—desired load entry temperature
u—control variable
$u_{max}$—maximal control variable
$Dp_L$—differential pressure across the load pump
$DP_{set}$—setpoint for the differential pressure across the load pump
DT—temperature difference across the load circuit
$DT_{max}$—maximal temperature difference

What is claimed is:

1. A method for limiting a supply flow in a heat transfer system, the method comprising the steps of:
   providing the heat transfer system such that the heat transfer system comprises: a supply conduit with a supply flow and a supply entry temperature; and at least one load circuit with a load pump which provides a load flow with a load entry temperature and a load exit temperature;
   setting the load entry temperature by changing the supply flow; and
   limiting the supply flow to a maximal flow while taking into account at least one temperature detected in the load circuit.

2. The method according to claim 1, wherein the provided heat transfer system further comprises at least one heat exchanger between the supply conduit and the load circuit.

3. The method according to claim 1, wherein the provided heat transfer system comprises at least one mixing device which mixes a load exit flow at least partly with the supply flow.

4. The method according to claim 1, wherein the supply flow is set on the basis of the load flow and of one or more temperature signals which are determined in the provided heat transfer system, on the basis of the supply entry temperature, the load entry temperature and the load exit temperature.

5. The method according to claim 1, wherein the supply flow is indirectly limited by way of at least one:
   limiting a thermal power flow in the load circuit;
   limiting the load exit temperature;
   limiting a difference between the load exit temperature and the load entry temperature.

6. The method according to claim 1, wherein for at least two input variables, in each case a maximal supply flow or a variable monotonic related to the maximal supply flow is determined on the basis of one of the input variables, and subsequently one of the determined maximal supply flows is selected for limiting the supply flow.

7. The method according to claim 1, wherein the supply flow is limited by limiting at least one of a speed of the load pump and a speed of a supply pump and by limiting an opening degree of a valve affecting the supply flow.

8. The method according to claim 1, wherein the supply flow is limited by limiting a control variable of a pressure controller or temperature controller affecting the supply flow.

9. The method according to claim 1, wherein the supply flow is limited by limiting a control variable of a control loop which regulates a load temperature and/or a load pressure in the load circuit including limiting a differential pressure across the load pump.

10. A heat transfer system comprising:
    a supply conduit for connection to a fluid supply;
    a return conduit for connection to a fluid return;
    at least one load circuit;
    a load pump operatively connected to the load circuit;
    a flow control device regulating a supply flow in the supply conduit, wherein the flow control device is configured to regulate a load entry temperature at an entry of the load circuit by way of regulating the supply flow;
    at least one temperature sensor operatively connected to the load circuit; and
    at least one limitation controller configured to directly or indirectly limit a supply flow to the load circuit to a predefined maximum in dependence on at least one temperature signal from the at least one temperature sensor.

11. The heat transfer system according to claim 10, further comprising at least one of a heat exchanger between the supply conduit and the load circuit and a mixing conduit which connects the exit of the load circuit to the supply conduit at a mixing point.

12. The heat transfer system according to claim 10, further comprising at least one of a pressure controller and a temperature controller operatively connected to the load circuit, wherein at least one of the pressure controller and the temperature controller is coupled to the limitation controller such that a control variable of the at least one of the pressure controller and the temperature controller can be limited by the limitation controller to a maximal value.

13. The heat transfer system according to claim 10, wherein the limitation controller is configured in a manner such that the limitation controller compares a thermal power flow in at least one of the load circuit and the load exit temperature and a difference between the load exit temperature and the load entry temperature, with an associated limit value and defines a maximum for a variable for setting the supply flow.

14. The heat transfer system according to claim 10, wherein the at least one temperature sensor is at least one of a temperature sensor arranged at the entry of the load circuit and detects a load entry temperature and a temperature sensor which is arranged at the exit of the load circuit and detects a load exit temperature.

15. The heat transfer system according to claim 10, wherein the flow control device comprises at least one of a supply pump which regulates the supply flow and a supply valve which regulates the supply flow.

16. The heat transfer system according to claim 10, wherein the load pump is configured for detecting a flow through the load circuit and is related to the flow control device for transmitting a signal corresponding to the detected flow.

17. The heat transfer system according to claim 10, wherein at least one of the flow control device and the limitation controller are integrated into a load pump assembly forming the load pump.

18. A heat transfer system supply flow method comprising the steps of:
- providing a heat transfer system comprising a supply conduit for connection to a fluid supply, a return conduit for connection to a fluid return, at least one load circuit, a load pump operatively connected to the load circuit, a flow control device for regulating a supply flow in the supply conduit, wherein the flow control device is configured to regulate a load entry temperature at an entry of the load circuit by way of regulating the supply flow, at least one temperature sensor operatively connected to the load circuit, at least one limitation controller configured to directly or indirectly limit a supply flow to the load circuit to a predefined maximum in dependence on at least one temperature signal from the at least one temperature sensor;
- setting the load entry temperature, with the flow control device, by changing the supply flow; and
- limiting the supply flow, with the at least one limitation controller, to a predefined maximum in dependence on at least one temperature signal from the at least one temperature sensor.

19. The method according to claim 18, wherein the provided heat transfer system further comprises at least one heat exchanger between the supply conduit and the load circuit.

20. The method according to claim 18, wherein the provided heat transfer system comprises at least one mixing device which mixes a load exit flow at least partly with the supply flow.

* * * * *